United States Patent
Ito et al.

(10) Patent No.: US 11,699,221 B2
(45) Date of Patent: Jul. 11, 2023

(54) IMAGE PROCESSING APPARATUS, STORAGE MEDIUM AND IMAGE PROCESSING METHOD

(71) Applicant: NINTENDO CO., LTD., Kyoto (JP)

(72) Inventors: Kuniaki Ito, Kyoto (JP); Tomohiro Kawase, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 297 days.

(21) Appl. No.: 17/109,529

(22) Filed: Dec. 2, 2020

(65) Prior Publication Data
US 2021/0287349 A1    Sep. 16, 2021

(30) Foreign Application Priority Data
Mar. 16, 2020  (JP) .............................. JP2020-044948

(51) Int. Cl.
*G06T 5/00*  (2006.01)
*G06T 5/50*  (2006.01)
(Continued)

(52) U.S. Cl.
CPC .............. *G06T 5/50* (2013.01); *A63F 13/52* (2014.09); *G06T 5/009* (2013.01); *G06T 7/90* (2017.01);
(Continued)

(58) Field of Classification Search
CPC ............ G06T 5/50; G06T 5/009; G06T 7/90; G06T 11/001; G06T 3/4007; A63F 13/52;
(Continued)

(56) References Cited

U.S. PATENT DOCUMENTS

| | | | |
|---|---|---|---|
| 5,917,549 A | 6/1999 | Simons et al. | |
| 6,128,108 A * | 10/2000 | Teo | G06T 5/50 358/1.9 |
| 6,466,224 B1 * | 10/2002 | Nagata | G09G 5/026 345/592 |
| 6,573,905 B1 | 6/2003 | MacInnis et al. | |

(Continued)

FOREIGN PATENT DOCUMENTS

| | | |
|---|---|---|
| EP | 1 308 887 | 5/2003 |
| JP | 2002-027237 | 1/2002 |

(Continued)

OTHER PUBLICATIONS

JP-2009094902-A Machine translation of this foreign reference is obtained from Espaceneton Dec. 21, 2022.*

(Continued)

*Primary Examiner* — Nancy Bitar
*Assistant Examiner* — Vaisali Rao Koppolu
(74) *Attorney, Agent, or Firm* — Nixon & Vanderhye, PC

(57) ABSTRACT

An information processing apparatus that functions as a non-limiting example image processing apparatus includes a processor. When an original image drawn with horizontally-long first pixels is to be drawn by square second pixels, the processor generates two intermediate image data in each of which the number of second pixels is 1.2 times the number of first pixels of the original image data, by generating a second area formed with six (6) second pixels arranged in a horizontal direction for each of first areas that are formed dividing the original image by every five (5) first pixels arranged in the horizontal direction, and outputs the two intermediate image data to a display control device. The display control device generates output image data by synthesizing the two intermediate image data, and outputs the generated output image data to a display. The output image data is generated in each of the second areas with colors that (Continued)

include colors of the second pixels at both ends, which are in agreement with colors of the first pixels at both ends in each corresponding first area and colors of the second pixels other than the both ends, each of which is generated based on colors of adjacent two first pixels in corresponding first area.

12 Claims, 6 Drawing Sheets

(51) Int. Cl.
    *A63F 13/52*     (2014.01)
    *G06T 7/90*     (2017.01)
    *G06T 11/00*     (2006.01)

(52) U.S. Cl.
    CPC ..... *G06T 11/001* (2013.01); *A63F 2300/6692* (2013.01)

(58) Field of Classification Search
    CPC ............ A63F 2300/6692; G09G 5/005; G09G 2340/0407; G09G 2340/0442; G09G 2340/10; G09G 5/026; G09G 5/397; H04N 7/0122; H04N 7/0135
    See application file for complete search history.

(56) References Cited

U.S. PATENT DOCUMENTS

| | | | |
|---|---|---|---|
| 2003/0214508 A1* | 11/2003 | Aleksic | G06T 15/503 |
| | | | 345/589 |
| 2007/0257940 A1 | 11/2007 | Ohta | |
| 2008/0122946 A1* | 5/2008 | Sung | H04N 9/09 |
| | | | 348/E5.038 |
| 2015/0350489 A1* | 12/2015 | Hasegawa | H04N 1/3876 |
| | | | 358/449 |

FOREIGN PATENT DOCUMENTS

| | | | | |
|---|---|---|---|---|
| JP | 2007-296218 | | 11/2007 | |
| JP | 2009-094902 | | 4/2009 | |
| JP | 2009094902 A | * | 4/2009 | ............... H04N 9/74 |
| WO | 2005/096624 | | 10/2005 | |
| WO | WO-2005096624 A1 | * | 10/2005 | ........... H04N 7/0122 |

OTHER PUBLICATIONS

Extended European Search Report dated Jul. 23, 2021 in corresponding European Application No. 21154548.8, 9 pages.
European Patent Office Search Report for Application No. 21154548.8 dated May 3, 2023, 4 pages.
Image Scaling from Wikipedia, https://en.wikipedia.org/w/index.php?title=image_scaling&oldid=943053247, 7 pages.

* cited by examiner

FIG. 2A  HORIZONTALLY-LONG PIXEL (PIXEL ASPECT RATIO 1.2:1)
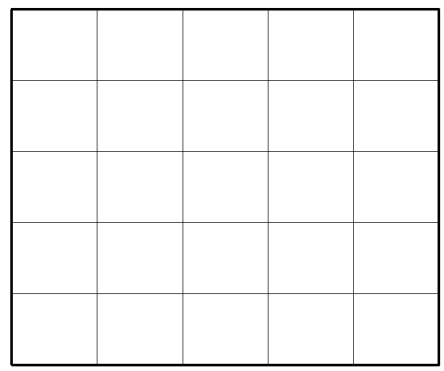
FIG. 2B  SQUARE PIXEL (PIXEL ASPECT RATIO 1:1)
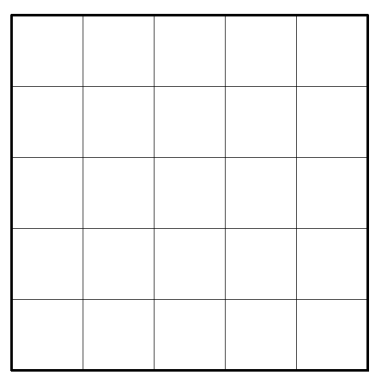
FIG. 2C  SQUARE PIXEL (PIXEL ASPECT RATIO 1:1)
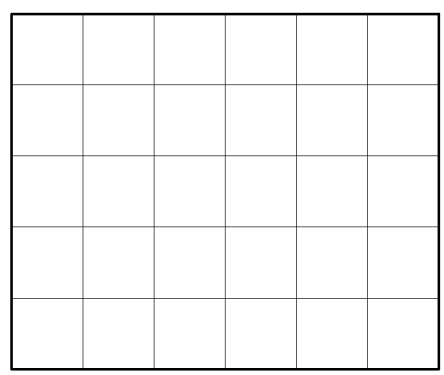

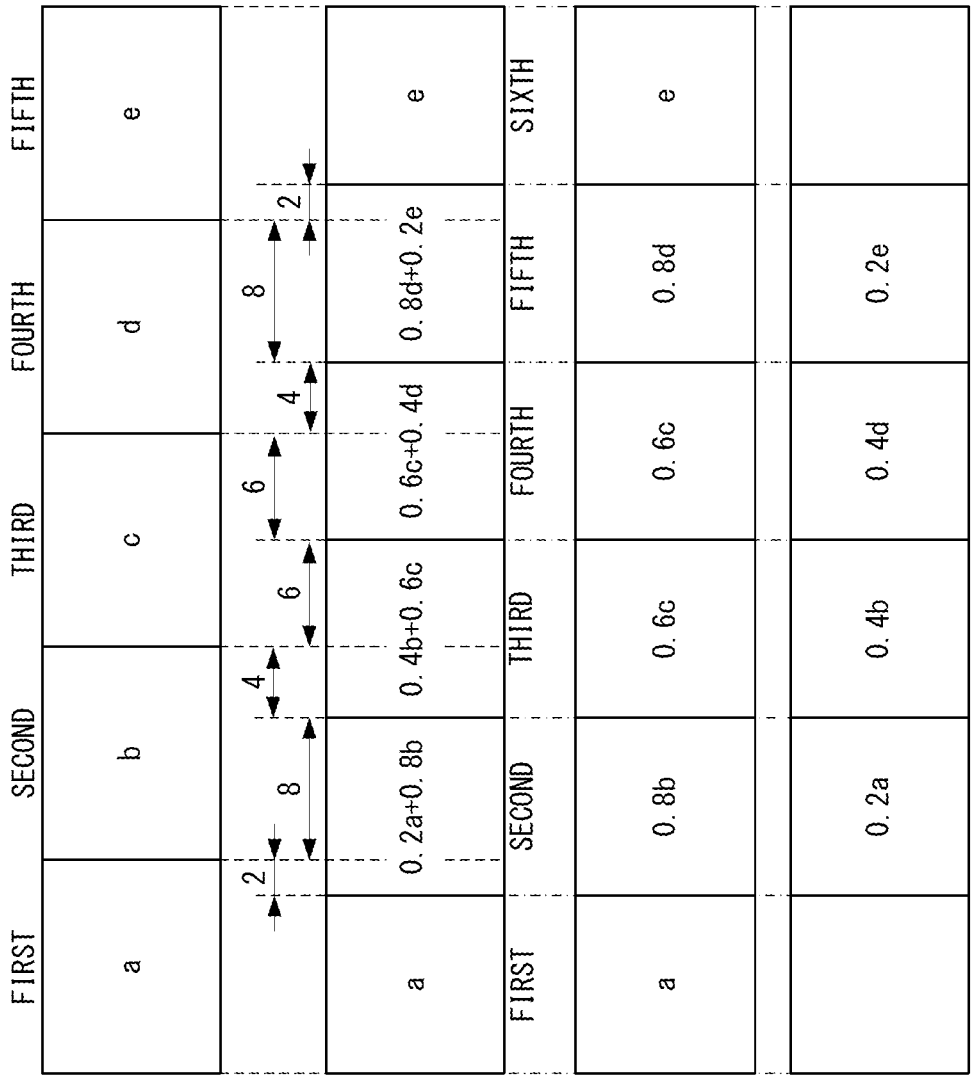
FIG. 3A IMAGE DRAWN WITH HORIZONTALLY-LONG PIXELS
FIG. 3B OUTPUT IMAGE
FIG. 3C FIRST INTERMEDIATE IMAGE
FIG. 3(D) SECOND INTERMEDIATE IMAGE

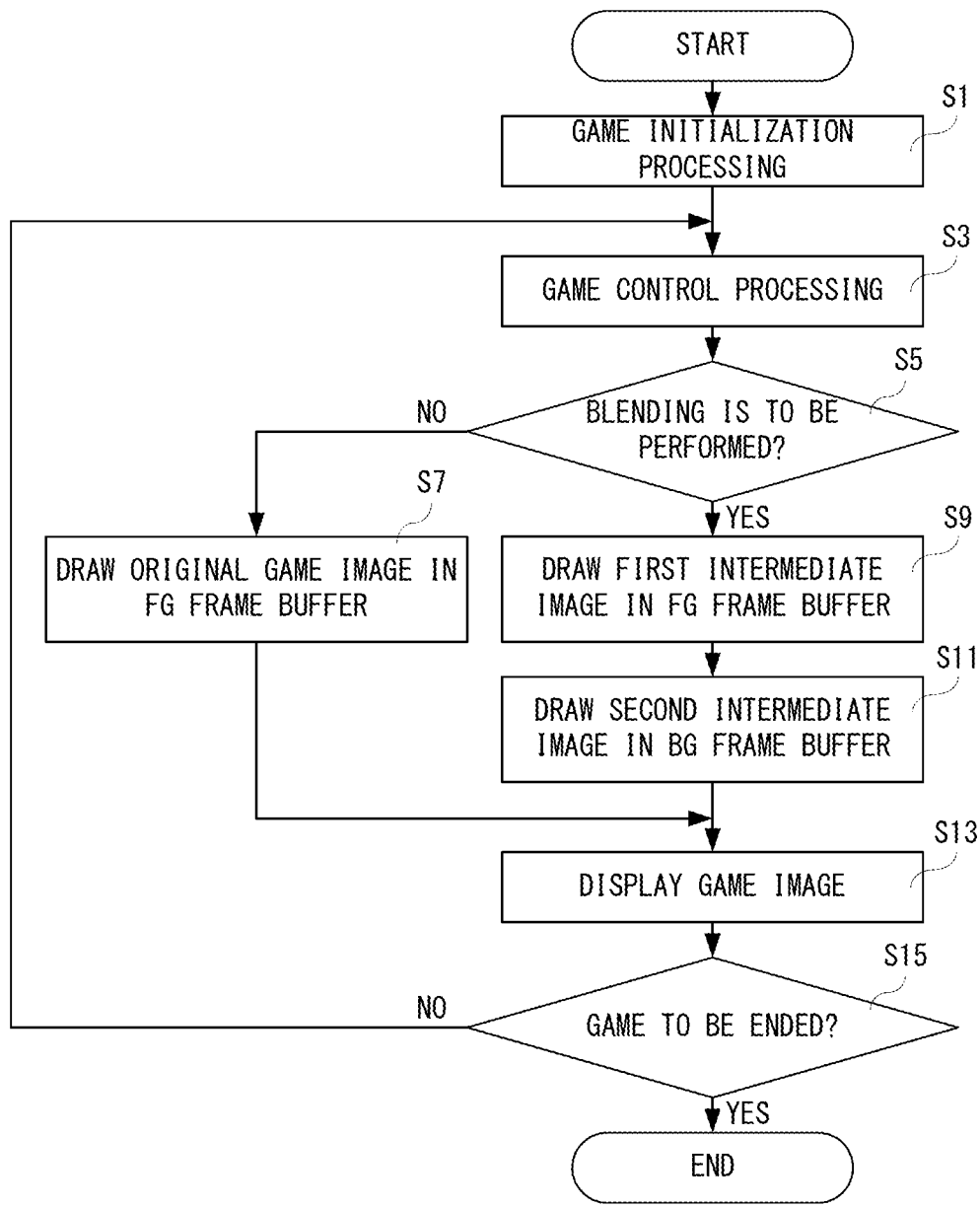

IMAGE PROCESSING APPARATUS, STORAGE MEDIUM AND IMAGE PROCESSING METHOD

CROSS REFERENCE OF RELATED APPLICATION

This application claims priority to Japanese Patent Application No. 2020-44948 filed on Mar. 16, 2020, the entire contents of which are incorporated herein by reference.

FIELD

This application describes an image processing apparatus, a storage medium and an image processing method, in which an image is displayed on a display.

SUMMARY

It is a primary object of an embodiment(s) is to provide a novel image processing apparatus, storage medium and image processing method.

Moreover, it is another object of the embodiment(s) is to provide an image processing apparatus, storage medium and image processing method, capable of preventing a user from feeling uncomfortable as much as possible.

A first embodiment is an image processing apparatus comprising one or more processors, wherein the one or more processors: generate two intermediate image data in each of which number of pixels in a horizontal direction is larger than that of original image data by generating, for each of first areas formed when dividing the original image data by every M first pixels in the horizontal direction, each of corresponding second areas each being formed by N second pixels (N is larger than M); and generate single output image data by mixing colors of the second pixels in corresponding positions in the two intermediate image data, wherein in each of the second areas of each of the generated two intermediate image data, colors of the second pixels at both ends are set so that results of mixing the colors in corresponding positions of the two intermediate image data are in agreement with colors of the first pixels at both ends of the first area of the original image data, and a color of each of the second pixels between the both ends is set based on colors of adjacent two first pixels within the first area of the original image data in corresponding positions of the two intermediate image data.

A second embodiment is the image processing apparatus according to the first embodiment, wherein the one or more processors generate the output image data by overlapping first intermediate image data of a foreground side and second intermediate image data of a background side, colors of a part of the second pixels of the first intermediate image data are colors that transparency is reflected to colors of a part of the first pixels of the original image data.

A third embodiment is the image processing apparatus according to the second embodiment, further comprising a storage that stores a lookup table including a first color palette corresponding to respective colors used for the first pixels of the original image data and one or more second color palettes in which one or more predetermined different transparency are set to the respective colors, wherein the one or more processors acquire at least a part of colors of the pixels of the first intermediate image data and the second intermediate image data by referring to the one or more second color palettes.

A fourth embodiment is the image processing apparatus according to the third embodiment, wherein the image processing apparatus is provided with the second color palette that predetermined transparency corresponds to a $(0<\alpha<1)$ but not provided with the second color palette that corresponds to transparency of $1-\alpha$, wherein the one or more processors generate a fifth color that is substantially equal to a fourth color generated by mixing a second color that the transparency of $1-\alpha$ is reflected to a first color of the second pixel of the first intermediate image data and a third color of the second pixel of the second intermediate image data, by mixing a sixth color that the transparency of $\alpha$ is reflected to the third color of the second pixel of the first intermediate image data and the first color of the second pixel of the second intermediate image data.

A fifth embodiment is an image processing apparatus comprising one or more processors, wherein the one or more processors: generate two intermediate image data in each of which number of pixels in a horizontal direction is larger than that of original image data, for each of first areas formed when dividing the original image data by every five (5) first pixels in the horizontal direction, by generating each of corresponding second areas each being six (6) second pixels in the horizontal direction; and generate single output image data by mixing colors of the second pixels in corresponding positions in the two intermediate image data, wherein when colors of the five first pixels are "a" color, "b" color, "c" color, "d" color and "e" color from left, in the six second pixels corresponding to the second areas of the generated output image data, colors of the second pixels at both end are in agreement with "a" color and "e" color of the first pixels at both end of the first area of the original image data and a color of each of the second pixels between the both ends is generated by mixing the colors of each set (b, a), (c, b), (c, d) and (d, e) with predetermined ratios sequentially from the left.

A sixth embodiment is the image processing apparatus according to the fifth embodiment, wherein colors of the second pixels in each of the second areas of first intermediate image data out of the two intermediate image data other than the second pixels at the both ends are "b" color that transparency is 80%, "c" color that transparency is 60%, "c" color that transparency is 60% and "d" color that is transparency is 80%, respectively, and colors of the second pixels in each of the second areas of second intermediate image data out of the two intermediate image data other than the second pixels at the both ends are "a" color that transparency is 20%, "b" color that transparency is 40%, "d" color that transparency is 40% and "e" color that is transparency is 20%, respectively.

A seventh embodiment is the image processing apparatus according to the sixth embodiment, wherein colors of the second pixels at the both ends in each of the second areas of the first intermediate image data of a foreground side out of the two intermediate image data are "a" color that transparency is 0% and "e" color that transparency is 0%, respectively.

An eighth embodiment is an image processing apparatus comprising one or more processors, wherein the one or more processors: generate two intermediate image data in each of which number of pixels in a horizontal direction is larger than that of original image data by generating, for each of first areas formed when dividing the original image data by every M first pixels in the horizontal direction, each of corresponding second areas each being formed by N second pixels (N is larger than M); and generate single output image data by mixing colors of the second pixels in corresponding positions of the two intermediate image data, wherein in each of the second areas of each of the generated two intermediate image data, colors of the second pixels at both ends are set so that results of mixing the colors in corresponding positions of the two intermediate image data are in agreement with colors of the first pixels at both ends of the first area of the original image data, and for each of the second pixels between the both ends in corresponding positions in the two intermediate image data, a color is generated by mixing colors of two adjacent first pixels in the first area of the original image data with a ratio of areas of portions that the second pixel is corresponding to the two adjacent first pixels.

A ninth embodiment is an image processing apparatus comprising one or more processors and a microcontroller, wherein the one or more processors generate two intermediate image data in each of which number of pixels in a horizontal direction is larger than that of original image data by generating, for each of first areas formed when dividing the original image data by every M first pixels in the horizontal direction, each of corresponding second areas each being formed by N second pixels (N is larger than M), and the microcontroller generates single output image data by mixing colors of the second pixels in corresponding positions of the two intermediate image data, and the one or more processors output the output image data generated by the microcontroller, wherein in each of the second areas of each of the two intermediate image data generated by the one or more processors, colors of the second pixels at both ends are set so that results of mixing the colors in corresponding positions of the two intermediate image data are in agreement with colors of the first pixels at both ends of the first area of the original image data, and a color of each of the second pixels between the both ends is set based on colors of adjacent two first pixels within the first area of the original image data in corresponding positions of the two intermediate image data.

A tenth embodiment is a non-transitory computer readable storage medium storing an image processing program executable by a computer of an image processing apparatus that comprises one or more processors and an output image generating portion that outputs single output image data by mixing colors of pixels in corresponding positions of two intermediate image data, wherein the image processing program causes the one or more processors to: generate two intermediate image data in each of which number of pixels in a horizontal direction is larger than that of original image data by generating, for each of first areas formed when dividing the original image data by every M first pixels in the horizontal direction, each of corresponding second areas each being formed by N second pixels (N is larger than M); and output the two intermediate image data to the output image generating portion, wherein in each of the second areas of each of the generated intermediate image data, colors of the second pixels at both ends are set so that results of mixing the colors in corresponding positions of the two intermediate image data are in agreement with colors of the first pixels at both ends of the first area of the original image data, and a color of each of the second pixels between the both ends is set based on colors of adjacent two first pixels within the first area of the original image data in corresponding positions of the two intermediate image data.

An eleventh embodiment is an image processing method, comprising: generating two intermediate image data in each of which number of pixels in a horizontal direction is larger than that of original image data by generating, for each of first areas formed when dividing the original image data by every M first pixels in the horizontal direction, each of corresponding second areas each being formed by N second pixels (N is larger than M); and generating single output image data by mixing colors of the second pixels in corresponding positions in the two intermediate image data, wherein in each of the second areas of each of the two intermediate image data, colors of the second pixels at both ends are set so that results of mixing the colors in corresponding positions of the two intermediate image data are in agreement with colors of the first pixels at both ends of the first area of the original image data, and a color of each of the second pixels between the both ends is set based on colors of adjacent two first pixels within the first area of the original image data in corresponding positions of the two intermediate image data.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 2A is an illustration view showing a part of a non-limiting example image drawn with horizontally-long pixels, FIG. 2B is an illustration view showing a non-limiting example image when the image shown in FIG. 2A is drawn by the square pixels of the same number, and FIG. 2C is an illustration view showing a non-limiting example image when the image shown in FIG. 2A is drawn by square pixels of the increased number.

FIG. 3A is an illustration view showing a non-limiting example first area when an image is drawn with horizontally-long pixels, FIG. 3B is an illustration view showing a non-limiting example second area when an output image corresponding to the image shown in FIG. 3A is drawn by square pixels, FIG. 3C is an illustration view showing a non-limiting example second area when a first intermediate image based on the image shown in FIG. 3A is drawn by the square pixels, and FIG. 3D is an illustration view showing a non-limiting example second area when a second intermediate image based on the image shown in FIG. 3A is drawn by the square pixels.

FIG. 6 is a flow chart showing non-limiting example information processing of a processor of the information processing apparatus shown in FIG. 1.

DETAILED DESCRIPTION OF NON-LIMITING EXAMPLE EMBODIMENTS

Figure 1:
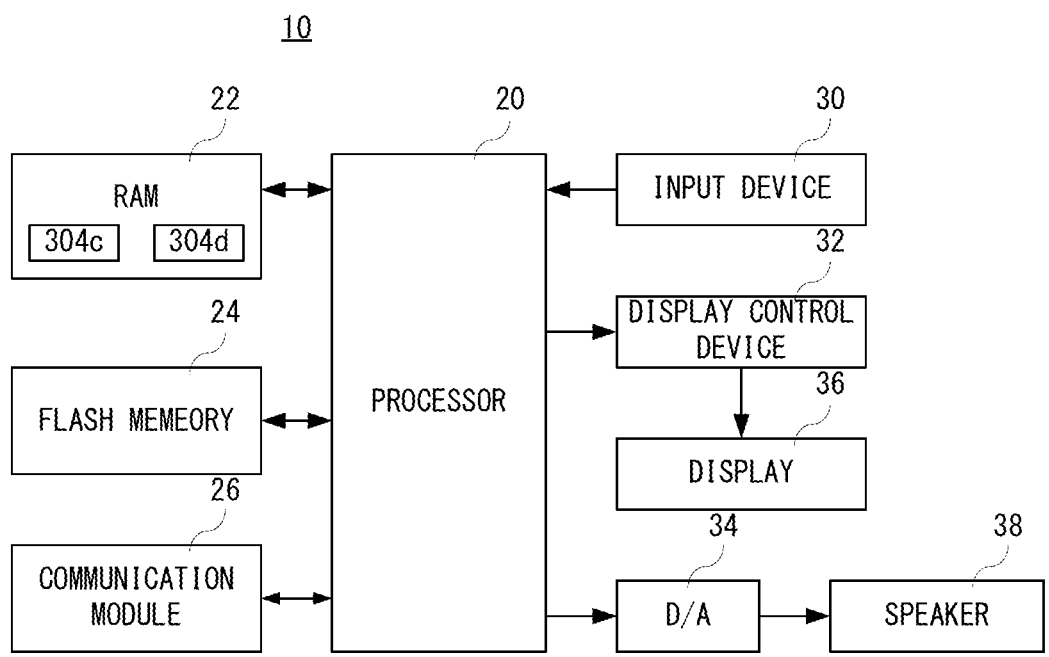
FIG. 1 is a block diagram showing non-limiting example electric structure of an information processing apparatus.

With reference to FIG. 1, a non-limiting example information processing apparatus 10 functions also as an image processing apparatus, and includes a processor 20. The processor 20 is connected with a RAM 22, a flash memory 24, a communication module 26, an input device 30, a display control device 32 and a D/A converter 34. Moreover, the display control device 32 is connected with a display 36, and the D/A converter 34 is connected with a speaker 38.

The processor 20 is in charge of overall control of the information processing apparatus 10. Specifically, the processor 20 is a SoC (System-on-a-Chip) incorporating functions of a CPU and a GPU. The RAM 22 is a volatile storage medium, and is used as a working memory and a buffer memory for the processor 20. Moreover, the RAM 22 is a main memory of the information processing apparatus 10, and has two frame buffers 304c and 304d (see FIG. 5). In this embodiment, there are provided with the frame buffer 304c in a foreground side (hereinafter, referred to as "FG") and the frame buffer 304d in a background side (hereinafter referred to as "BG").

However, the frame buffer 304c and the frame buffer 304d may be formed in a single memory other than the RAM 22, and may be formed in two memories other than the RAM 22.

The flash memory 24 is a nonvolatile storage medium, and used in order to store programs of various kinds of applications, and store (save) various kinds of data. For example, the program of the application and necessary data are read out from the flash memory 24 to be stored in the RAM 22.

However, the application corresponds to applications related to various kinds of information processing, such as a game application, a manual display application, a document creation application, an email application, a drawing application, a character practice application, a language training application, a learning application, etc.

The communication module 26 has a function to access a wireless LAN by a system conforming to the standard of IEEE 802.11.b/g, for example. Therefore, for example, the processor 20 transmits or receives data to or from other equipment via an access point and a network such as Internet with using the communication module 26. For example, other equipment may be computers or other information processing apparatuses 10. However, it is also possible to transmit or receive data to or from other equipment directly with using the communication module 26.

However, the communication module 26 may have a function of connecting to a wired LAN by using a communication system according to Ethernet (registered trademark).

Moreover, the communication module 26 may have a function of performing short-distance wireless communications unlike a function of accessing a wireless LAN or a wired LAN. Specifically, the communication module 26 has a function to transmit or receive an infrared signal to or from other equipment with a predetermined communication system (infrared system, for example), and a function to perform wireless communication with the same or similar type of information processing apparatus according to a predetermined communication protocol (multilink protocol, for example). In this case, for example, the processor 20 can transmit or receive data to or from the same or similar type of other information processing apparatuses directly with using the communication module 26. However, instead of the short-distance wireless communication of an infrared system, short-distance wireless communication according to other wireless-communication standards such as Bluetooth (registered trademark) may be performed.

The input device 30 includes a touch panel and various kinds of push buttons or switches provided on the information processing apparatus 10, and is used various kinds of operations such as menu selection, instructions in the application, etc. However, as the input device 30, a pointing device such as a computer mouse other than a touch panel, an input means such as a microphone, a camera, etc. may be provided instead of the touch panel and the push buttons, or in addition to the touch panel and the push buttons. Moreover, a touch panel may be integrally incorporated within the display 36 described later. The display 36 in this case is a touch panel integrated type display.

The display control device 32 is used in order to display various kinds of images on the display 36 under instructions of the processor 30. The display images correspond to an execution screen when the above-described application is being executed, a menu screen when selecting execution of the above-described application, or the like. The display control device 32 is to be described later in detail. The display 36 is typically an LCD. However, as the display 36, an organic EL display can be used.

The D/A converter 34 converts sound data applied from the processor 20 into an analog sound signal to output to the speaker 38. However, the sound data may be data concerning a sound generated by a character or object, sound effects, BGM, etc.

In addition, the electric structure of the information processing apparatus 10 shown in FIG. 1 is a mere example, and it does not need to be limited to this. For example, the communication module 26 may be dispensed with.

In the information processing apparatus 10 of such structure, it is possible to execute game software for the conventional game machines (that is, the program of the game application) as it is with an emulator, etc., or to play remake software that a story, etc. is partially modified.

With a conventional game image processing apparatus, when converting the game image of low resolution into a game image of high resolution, a looking effect of the conventional game images of low resolution is improved by performing jaggy interpolation processing and color enhancement processing.

However, although data of the game image is drawn with a horizontally-long pixel (hereinafter, referred to as "first pixel") in the conventional game apparatus, in recent years, data of the game image may be drawn by a square pixel (hereinafter, referred to as "second pixel"). Therefore, if the application of a conventional virtual game is executed as it is by an emulator etc. as described above and designated colors of respective pixels are displayed on the display 36 as they are, the game image is displayed in a vertically-long manner as compared with the game image displayed on a monitor of the conventional television receiver. For this reason, users who want to obtain the same image experience as at that time may have a possibility of feeling uncomfortable.

However, in this specification, the term "pixel" means the minimum unit constituting a digital image.

In addition, since past game apparatus, such as Nintendo Entertainment System (NES: registered trademark), Super Nintendo Entertainment System (SNES: registered trademark), etc. is connected to a monitor using a Braun tube (or cathode-ray tube) like the conventional television receiver, and such a monitor is horizontally-long shape, and therefore, in the past game apparatus, data of the game image is drawn with the first pixels. As an example, a size of a frame buffer is 240 pixels by 256 pixels in the past game apparatus. Moreover, an aspect ratio of the conventional monitor screen is 4:3, and a pixel aspect ratio (also referred to as "pixel ratio") of the conventional first pixel is 1.2:1.

Here, a case where data of the game image is drawn by executing emulation of the game software is described in order to explain intelligibly; however, as long as the data of the image (hereinafter, referred to as "original image data") is drawn with the first pixels and this original image data is to be drawn by the second pixels, it does not need to be limited to the game software and the game image.

However, the original image data may not be drawn by the first pixels. For example, when the original image data is drawn with the second pixels, processing of blending described later is unnecessary.

Here, a reason why a game image is displayed in a vertically-long manner as described above will be specifically described with referring to FIG. 2A and FIG. 2B. FIG. 2A is an illustration view a part of non-limiting example original image data drawn by the first pixels. FIG. 2B is an illustration view showing a non-limiting example image when a part of the original image data shown in FIG. 2A is drawn by the second pixels.

As above-described, the pixel aspect ratio of the pixels shown in FIG. 2A is 1.2:1, and the pixel aspect ratio of the pixels shown in FIG. 2B is 1:1. Moreover, in FIG. 2A and FIG. 2B, five (5) pixels are arranged in a vertical direction and a horizontal direction, respectively. Moreover, in this embodiment, in order to show intelligibly, the vertical length of the first pixel and the vertical length of the second pixel are made to be equal to each other.

In addition, although each pixel is shown by a rectangle frame in FIG. 2A and FIG. 2B, in fact, lines indicating the frame are not drawn. This also applies to FIG. 2C described later.

It may be understood with reference to FIG. 2A and FIG. 2B, since the second pixel has a width shorter than that of the first pixel, if the original image is drawn by the second pixels of the same number as the first pixels, the original image that is drawn by the second pixels looks vertically longer than the original image that is drawn with the first pixels.

Therefore, in this embodiment, in order to avoid the above-described inexpediencies, when drawing the original image data having been drawn with the first pixels by the second pixels, two intermediate image data drawn by the second pixels the number of which is N/M times in the horizontal direction are generated, and these are synthesized. Described briefly, the original image data is drawn with using the second pixels the number of which is larger than the number of first pixels, in the horizontal direction. That is, when drawing a part of the original image data shown in FIG. 2A by the second pixels, as shown in FIG. 2C, the number of pixels in the horizontal direction is increased. In this embodiment, M=5 and N=6. Therefore, N/M times are 1.2 times. Moreover, N/M times are not an integral multiple. It is because if it is an integral multiple, it is not necessary to synthesize the two intermediate image data and what is necessary is just to draw each image that is drawn with the first pixels by the second pixels the number of which is obtained by multiplying the number of first pixels in the horizontal direction by an integer.

However, in this embodiment, the intermediate image data is data of an image generated based on the original image data, and is data of an image that the transparency according to a predetermined ratio when mixing colors to a part of the second pixels is set.

With reference to FIG. 3A-FIG. 3D, a method of generating and synthesizing the two intermediate image data will be described. FIG. 3A is an illustration view that five (5) first pixels drawing the original image data are arranged in the horizontal direction, FIG. 3B is an illustration view showing six (6) second pixels in positions corresponding to the five first pixels in FIG. 3A, out of data of an output image (hereinafter, referred to as "output image data") to the display 36, FIG. 3C is an illustration view showing six second pixels in positions corresponding to the five first pixels in FIG. 3A, out of data of an intermediate image drawn in the frame buffer 304c of a FG side (hereinafter, referred to as "first intermediate image data"), and FIG. 3D is an illustration view showing six second pixels in positions corresponding to the five first pixels in FIG. 3A, out of data of an intermediate image drawn in the frame buffer 304d of a BG side (hereinafter, referred to as "second intermediate image data").

In addition, the six second pixels of the first intermediate image data shown in FIG. 3C and the six second pixels of the second intermediate image data shown in FIG. 3D are pixels in the same position as those of the six second pixels of the output image data shown in FIG. 3B, respectively.

Moreover, a size of each of the frame buffers 304c and 304d is 307 pixels in horizontal by 240 pixels in vertical, and in this embodiment, is substantially the same as the conventional frame buffer when using the first pixels since the vertical length of the first pixel and the vertical length of the second pixel are made to be the same.

Furthermore, in this embodiment, since the data of the image is drawn with a raster scan system, the image is sequentially drawn rightward from an upper left of an image, and if reaching a right end, the scanning line is lowered to draw sequentially rightward from a left end, and such processing is executed repeatedly.

As shown in FIG. 3A, five (5) first pixels are arranged in the horizontal direction, and each of characters "a", "b", "c", "d" and "e" indicates a color of corresponding each of the first pixels. Specifically, the 1-st first pixel (in FIG. 3A, a left end) is "a" color, the 2-nd first pixel is "b" color, the 3-rd first pixel is "c" color, the 4-th first pixel is "d" color, and the 5-th first pixel (in FIG. 3A, a right end) is "e" color.

In this embodiment, when drawing the original image data drawn with the first pixels by the second pixels, as described above, the second pixels the number of which is 1.2 times the number of first pixels are used. This is because the pixel aspect ratio of the first pixel is 1.2:1, and by using the second pixels the number of which is 1.2 times the number of the first pixels, it is possible to generate, for each of areas formed by dividing the image by every M first pixels (hereinafter, referred to as "first area") in the horizontal direction, each of corresponding areas (hereinafter, referred to as "second area") such that in each of the second areas, the number of second pixels in the horizontal direction becomes N (1.2×M).

However, for convenience of explanation, it is only expressed as "dividing" and the original image data is not divided in actual processing.

As described above, FIG. 3B shows six (6) second pixels of the positions corresponding to five (5) first pixels shown in FIG. 3A in the output image data to be output to the display 36.

In addition, in this embodiment, when the image drawn with the first pixels and the image drawn by the second pixels are virtually overlapped so that the upper left positions (that is, beginning pixels) of respective images correspond to each other, the second pixel arranged in a position overlapping with the first pixel that is to be noted is referred to as "the second pixel of the position corresponding to the first pixel", and the first pixel arranged in the position overlapping with the second pixel that is to be noted is referred to as "the first pixel of a position corresponding to the second pixel".

Moreover, as shown in FIG. 3A and FIG. 3B, in this embodiment, the output image data is drawn, for each of the second pixels at both ends (1-st and 6-th) out of the six second pixels, by each of the colors of the first pixels of the original image data as it is. Moreover, the output image data is drawn, for each of the second pixels between the both ends out of the six second pixels, by a color that the colors of two adjacent first pixels of the original image data in corresponding positions are mixed in a predetermined ratio. However, the predetermined ratio is a ratio on transparency with colors of two first pixels.

Therefore, as shown in FIG. 3B, out of the six second pixels, the 1-st second pixel (left end) is "a" color, and the 6-th second pixel (right end) is "e" color. Out of the six second pixels, the 2-nd second pixel is the color that "a" color and "b" color are mixed by the predetermined ratio P1, the 3-rd second pixel is the color that "b" color and "c" color are mixed by the predetermined ratio P2, the 4-th second pixel is the color that "c" color and "d" color are mixed by the predetermined ratio P3, and the 5-th second pixel is the color that "d" color and "e" color are mixed by the predetermined ratio P4. That is, in the output image data, the color of each of the second pixel between the both ends of the six second pixels is generated by mixing the colors of each set (b, a), (c, b), (c, d) and (d, e) with the predetermined ratio sequentially from the left.

The predetermined ratios P1, P2, P3 and P4 are distribution ratios of colors, and determined, when each of the 2-nd to 5-th second pixels is overlapped with adjacent two first pixels in a position corresponding to each of the 2-nd to 5-th second pixels, by a ratio of areas of portions that the second pixel is overlapped with the two adjacent first pixels.

As shown in FIG. 3A and FIG. 3B, the 2-nd second pixel is overlapped with the 1-st first pixel about 20% of the gross area, and with the 2-nd first pixel about the remaining 80%. The ratios of overlapping area are indicated between FIG. 3A and FIG. 3B. Therefore, the predetermined ratio P1 is 1 (one) to 4 (four), and the 2-nd second pixel is "0.2a+0.8b" color. Here, the symbol "+" means mixture (or synthesis). Moreover, the coefficients are numerical values based on the predetermined ratio P1, and are set in this embodiment using transparency. The transparency is a numerical value of 0% to 100%, and this is denoted by the numerical value of 0 (zero) to 1 (one). However, when the transparency is 100% (that is, completely transparent), the α value is 0 (zero), and when the transparency is 0% (that is, opaque), the α value is 1 (one). These are the same also about a case with colors of other second pixels.

Therefore, the 3-rd second pixel overlaps with the 2-nd first pixel for 40% of the gross area and with the 3-rd first pixel for the remaining 60%. Therefore, the predetermined ratio P2 is 2 (two) to 3 (three), and the 3-rd second pixel is "0.4b+0.6c" color.

Moreover, the 4-th second pixel overlaps with the 3-rd first pixel for 60% of the gross area and with the 4-th first pixel for the remaining 40%. Therefore, the predetermined ratio P3 is 3 (three) to 2 (two), and the 4-th second pixel is "0.6c+0.4d" color.

Furthermore, the 5-th second pixel overlaps with the 4-th first pixel for 80% of the gross area and with the 5-th first pixel for the remaining 20%. Therefore, the predetermined ratio P4 is 4 (four) to 1 (one), and the 5-th second pixel is "0.8d+0.2e" color.

As shown in FIG. 3B, in order to generate the output image that the colors are mixed, as described above, in this embodiment, two intermediately image data before mixture are generated. FIG. 3C shows a part of first intermediate image data, and FIG. 3D shows a part of second intermediate image data.

As shown in FIG. 3C, in the first intermediate image data, the 1-st second pixel is "a" color, the 2-nd second pixel is "0.8b" color, the 3-rd second pixel is "0.6c" color, the 4-th second pixel is "0.6c" color, the 5-th second pixel is "0.8d" color, and the 6-th second pixel is "e" color.

Moreover, as shown in FIG. 3D, in the second intermediate image data, each of the 1-st second pixel and the 6-th second pixel has no color, the 2-nd second pixel is "0.2a" color, the 3-rd second pixel is "0.4b" color, the 4-th second pixel is "0.4d" color, and the 5-th second pixel is "0.2e" color.

A reason why there is no color in each of the second pixels at the both ends in the second intermediate image data is that each of the colors of the second pixels at the both ends in the first intermediate image data is the colors after synthesizing the first intermediate image data and the second intermediate image data. Therefore, when the transparency of each of the second pixels at the both ends is set to 100% (i.e., α=0) in the first intermediate image data, in the second intermediate image data, the colors of the second pixels at the both ends are set as "a" color and "e" color, respectively. Moreover, in another example, when each of the colors of the second pixels at the both ends are set to "a" color and "e" color each of which that the transparency is 50% (i.e., α=0.5) in the first intermediate image data, the colors of the second pixels at the both ends in the second intermediate image data are respectively set as "a" color and "e" color each of which the transparency is 50% (i.e., α=0.5).

Moreover, in this embodiment, in order to show the distribution ratio of the colors to be mixed intelligibly, the coefficients are set according to the predetermined ratios P1-P4 for the second intermediate image data, but the second intermediate image data is opaque because the second intermediate image data is the background side. That is, about the colors of pixels of the second intermediate image, the transparency is all 0% (i.e., α=1). For this reason, some colors of the second pixels of the first intermediate image data are colors that the transparency is reflected to some colors of the first pixels of the original image data.

Therefore, in this embodiment, except for the second pixels at the both ends of the second area, the first intermediate image data having transparent colors in which the coefficients are set according to the predetermined ratios P1-P4 and the second intermediate image data having opaque colors are synthesized, and as a result, in the output image data, the colors of the distribution ratios set according to the predetermined ratios P1-P4 is realized.

Furthermore, the first intermediate image data and the second intermediate image data shown in FIG. 3C and FIG. 3D are examples, and the colors set in the first intermediate image data and the colors set in the second intermediate image data may be replaced with each other. In this case, colors each having the transparency of 0% are set to the second pixels between the both ends of the second intermediate image data. Moreover, in this case, it may be possible to set colors each having the transparency is 100% to the second pixels at the both ends of the first intermediate image data.

As described above, in this embodiment, the first intermediate image data is drawn (or generated) in the frame buffer 304c of the FG side, and the second intermediate image data is drawn (or generated) in the frame buffer 304e of the BG side, and the first intermediate image data and the second intermediate image data are synthesized.

That is, when the original image data drawn with the first pixels is to be drawn by the second pixels, two intermediate image data are generated so that the number of pixels in the horizontal direction becomes 1.2 times the original image data by generating, for each of the first areas formed when dividing the original image for every five (5) first pixels in the horizontal direction, corresponding second area so that the horizontal direction is constituted by six (6) second pixels while increasing the number of second pixels in the horizontal direction. Then, the colors of the second pixels in the positions corresponding to each other are mixed in an order from respective beginning pixels of the second pixels, in the two generated intermediate mage data.

However, as for the second pixels at the both ends of in the respective second areas of the two intermediate image data, colors are set so that results of mixing the colors of the second pixels in corresponding positions in the two intermediate image data are in agreement with the colors of the first pixels at the both ends of the first area of the original image data. Moreover, as for the second pixels between the both ends in each of the second areas of the two intermediate image data, the colors thereof are mixed. That is, the colors of the two second pixels in corresponding positions in the two intermediate image data are generated based on two colors of adjacent first pixels within the first area in a position corresponding to the second area in the original image data, respectively.

Moreover, since a size of each of the frame buffers 304c and 304d is 307 pixels in horizontal by 240 pixels in vertical as described above, in fact, in the first intermediate image data and the second intermediate image data, the number of second pixels in the horizontal direction is not N/M times the original image data.

In addition, since a part of display image data (for example, several to several tens of pixels at both ends) is not displayed on the display 36, in the first intermediate image data and the second intermediate image data, the number of second pixels does not have to be N/M times as long as the number of second pixels is larger than the number of pixels of the original image data.

Figure 4:
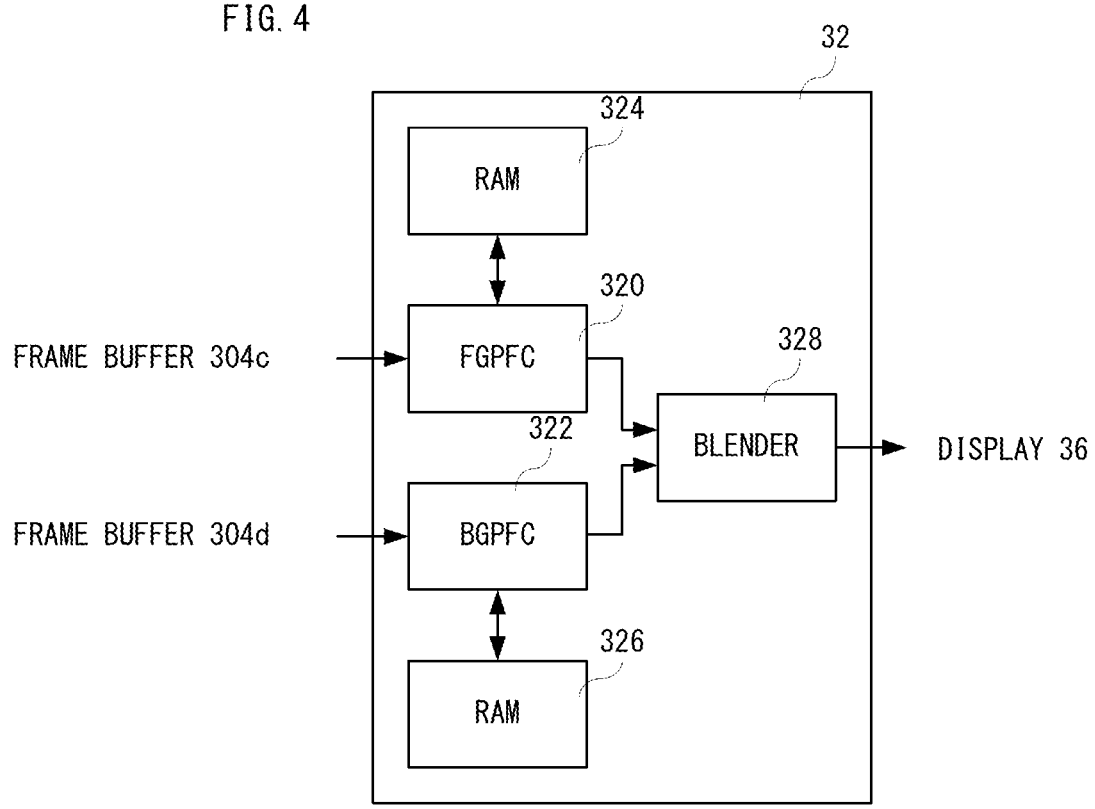
FIG. 4 is a block diagram showing non-limiting example electric structure of the display control device of the information processing apparatus shown in FIG. 1.

FIG. 4 is a block diagram showing non-limiting example structure of the display control device 32 shown in FIG. 1.3 The display control device 32 is a micro controller (or control IC), and Chrom-Art Accelerator controller (DMA2D) by ST Microelectronics can be used as an example.

As shown in FIG. 4, the display control device 32 includes a PFC of the FG side (hereinafter, referred to as "FGPFC") 320 and a PFC of the BG side (hereinafter, referred to as "BGPFC") 322. The FGPFC 320 is connected to a RAM 324 and to one input end of a blender 328. The BGPFC 322 is connected to a RAM 326 and to the other input end of the blender 328.

The FGPFC 320 is a pixel format conversion circuit of the foreground side, and converts the first intermediate image data that is input from the frame buffer 304c, that is, data of respective second pixels (hereinafter, referred to as "pixel data") into color data. The color data is data about a color represented by color information and additional information both described later. In this embodiment, the pixel data is data for an identification number (or identification information) described in a lookup table stored in the RAM 324.

The lookup table includes, as an example, a color palette for a plurality of (in this embodiment, 64 (sixty-four)) opaque colors that can be used in the conventional game machine (hereinafter, may be referred to as "opaque color palette". Moreover, in this embodiment, the lookup table also includes a color palette for colors in which the above-described plurality of (sixty-four) colors are represented with 20% of transparency (hereinafter, may be referred to as "transparency 20% color palette"), and a color palette for colors in which the above-described plurality of (sixty-four) colors are represented with 40% of transparency (hereinafter, may be referred to as "transparency 40% color palette").

In the lookup table, each color information and each additional information corresponding to each color information included in the above-described three color palettes are described in correspondence to the identification number. The color information is data about each value of R, G and B. Moreover, the additional information is data about an a value. In this embodiment, each of R, G, B and a is specified by 8-bit data. The $\alpha$ value is data about the transparency, and set with a numerical value between 1 (one) ("11111111") and 0 (zero) ("00000000"). In the above-described opaque color palette, since each of the sixty-four colors is opaque, the $\alpha$ value is set to 1 (one). Moreover, in the transparency 20% color palette, since the transparency is 20%, the $\alpha$ value is set as 0.8. Furthermore, in the transparency 40% color palette, since the transparency is 40%, the $\alpha$ value is set as 0.6.

In this embodiment, there are provided with the transparency 20% color palette and the transparency 40% color palette in each of which the transparency is a $(0<\alpha<1)$, but not provided with a color palette in which the transparency is 1-a. This is because when the transparency is 1-a, the colors may be exchanged between the FG side and the BG side. Therefore, although four kinds of color palettes whose transparency is 20%, 40%, 60% and 80% are originally needed, the information processing apparatus 10 (or display control device 32) of this embodiment is provided with only the transparency 20% color palette and the transparency 40% color palette, and omits color palettes of the transparency of 60% and 80%.

Although the colors set in the first intermediate image data and the colors set in the second intermediate image data may be replaced with each other in FIG. 3C and FIG. 3D as described above, when a color is expressed using a mathematical formula, it is expressed as the same color, but in fact, exactly the same color may not be generated. More specifically, a fourth color generated by mixing a second color that the transparency of 1-α is reflected to the first color of the second pixel of the first intermediate image data and a third color of the corresponding second pixel in the second intermediate image data, and on the assumption that a six color is a color that the transparency a is reflected to the third color of the second pixel of the first intermediate image data and a first color is a color of the corresponding second pixel in the second intermediate image data, a fifth color generated by mixing the sixth color and the first color are substantially equal to each other, but exactly the same color may not necessarily be generated.

In addition, although three color palettes formed in a single look-up table in this embodiment, it does not need to be limited to this. The three color palettes may be provided in separate look-up tables, respectively.

Returning to FIG. 4, the BGPFC 322 is a pixel format conversion circuit for the background side, and converts the second intermediate image data that is input from the frame buffer 304d, i.e., the pixel data of each pixel into color data. This pixel data is data designating the identification number of the look-up table stored in the RAM 326. In this embodiment, the look-up table stored in the RAM 326 is the same as the above-described look-up table stored in the RAM 324. Therefore, duplicate description about the contents and so on of the look-up table is omitted here.

The first intermediate image data and the second intermediate image data that the pixel data of each pixel is converted into the color data are mixed (or synthesized) by the blender 328. As described above, the output image that is output to the display 36 is generated by mixing the colors of the first intermediate image data and the colors of the second intermediate image data in a manner that the colors of the two second pixels in corresponding positions are mixed in an order from respective beginning second pixels.

Mixture of the colors is as having described above, and specifically, the color of each pixel of the output image is calculated according to the equation (1) where C is R, G or B. Moreover, as described above, "FG" means the foreground (or the first intermediate image data), "BG" means the background (or the second intermediate image data), and "OUT" means an output. However, what are mixed are a color of the second pixel in the first intermediate image data and a color of the second pixel in a position corresponding thereto in the second intermediate image data.

$$C_{OUT} = C_{FG} * \alpha_{FG} + C_{BG} * \alpha_{BG} \qquad (1)$$

However, as described above, in this embodiment, $\alpha_{FG}$=0.6, 0.8 or 1, and $\alpha_{BG}$=1. In addition, since the width of each of the frame buffer 304c and the frame buffer 304d is 307 bits in the horizontal direction and is not a multiple of 6 (six), a color is not calculated for the 307th bit of each line.

As described above, by multiplying the number of second pixels in the horizontal direction by 1.2 times, the difference in the pixel aspect ratio from the first pixel is absorbed, and for the second pixels other than the both ends of the six (6) second pixels, the colors are set by mixing the colors of two adjacent first pixels out of five (5) first pixels by which the original image data is drawn with the transparency ratio according to the area ratio of the two adjacent first pixels, whereby the output image that looks similar to the original image drawn with the first pixels can be drawn by the second pixels. Therefore, it is possible to prevent a user from feeling uncomfortable as much as possible.

Figure 5:
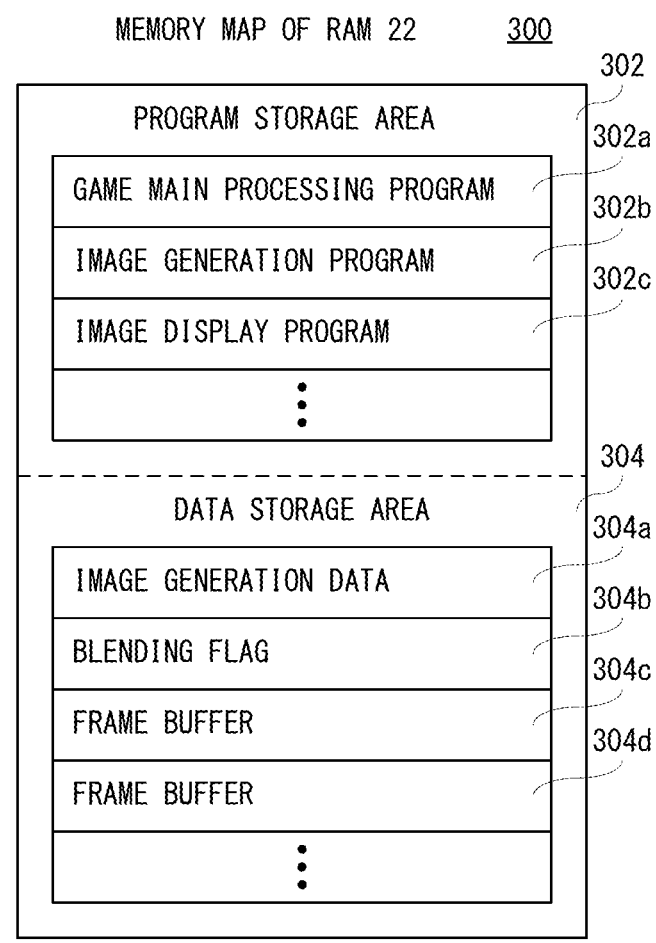
FIG. 5 is an illustration view showing a non-limiting example memory map of a RAM of the information processing apparatus shown in FIG. 1.

FIG. 5 is an illustration view showing a non-limiting example memory map 300 of the RAM 22 of the information processing apparatus 10 shown in FIG. 1. As shown in FIG. 5, the RAM 22 includes a program storage area 302 and a data storage area 304. The program storage area 302 is stored with a game program that is an example of an information processing program including image processing that generates and synthesizes the first intermediate image data and the second intermediate image data both described above.

The game program includes a game main processing program 302a, an image generation program 302b and an image display program 302c.

In addition, the information processing program (here, the game program) may be stored in advance in the flash memory 24, or may be acquired from an external information processing apparatus through a network such as an internet. Moreover, the information processing program may be obtained from an external memory such as an optical disk, a media card that is attachable to or detachable from the information processing apparatus 10. However, a part of the information processing program may be stored in the flash memory 24, and another part may be acquired from an external information processing apparatus or an external memory. These can be applied also to image generation data 304a to be described later.

The game main processing program 302a is a program for processing a main routine of a virtual game. The image generation program 302b is a program for generating data of various kinds of display image such as a game image (hereinafter, referred to as "display image data") using the image generation data 304a. In this embodiment, when the original image data is drawn by the second pixels, the image generation program 302b draws the display image data in the frame buffer 304c. Moreover, when the original image data is drawn with the first pixels, the image generation program 302b draws the first intermediate image data in the frame buffer 304c and the second intermediate image data in the frame buffer 304d, as the display image data. However, the display image data is data that pixel data is designated for each pixel. Each of the first intermediate image data and the second intermediate image data is also data that pixel data is designated for each pixel.

The image display program 302c is a program for outputting the display image data generated according to the image generation program 302b to the display control device 32. In this embodiment, the display image data (there is also a case of the first intermediate image data and the second intermediate image data) is output to the display control device 32, and the output image data is output to the display 36 from the display control device 32. However, the output image data is the display image data that is drawn in the frame buffer 304c, or the data that the first intermediate image data drawn in the frame buffer 304c and the second intermediate image data drawn in the frame buffer 304d are synthesized.

Although illustration is omitted, the program storage area 302 is also stored with other programs, such as an operation detection program for detecting an operation by the user or player, a communication program for performing communication with other information processing apparatuses (10), a sound output program for generating and outputting a sound required in game processing, etc.

The data storage area 304 is stored with the image generation data 304a and a blending flag 304b. Moreover, the frame buffer 304c and the frame buffer 304d are formed in the data storage area 304.

The image generation data 304a includes data of polygon data and texture data for generating the display image data, etc. The blending flag 304b is a flag indicating whether the original image data drawn with the first pixels is to be drawn by the second pixels. If the blending flag 304b is being turned on, it is determined that the original image data drawn with the first pixels is to be drawn by the second pixels. On the other hand, if the blending flag 304b is being turned off, it is determined that the original image data drawn with the first pixels is not to be drawn by the second pixels, and thus, usual drawing processing that the original image data is drawn with the first pixels is to be performed, without generating the first intermediate image data and the second intermediate image data.

The frame buffer 304c is a buffer (VRAM) for generating the first intermediate image data. The frame buffer 304d is a buffer (VRAM) for generating the second intermediate image data.

Although illustration is omitted, the data storage area 304 is further stored with operation data for executing the game processing and data required for the image processing in the game processing, and is provided with a counter(s) or timer(s).

FIG. 6 is a flowchart of non-limiting overall game processing of the virtual game. As shown in FIG. 6, if the overall game processing is started, the processor 20 executes game initialization processing in a step S1. If the virtual game is to be started from the beginning, here, the buffer area (for example, frame buffers 304c and 304d) of the RAM 22 is cleared, and performs initial setting of respective flags (for example, blending flag 304b). In this embodiment, the blending flag 304b is turned on or turned off according to whether the game image of the virtual game that is selected by the player is drawn with the first pixels, and thus, whether the conventional virtual game is to be emulated.

In a subsequent step S3, game control processing is executed. For example, the processor 20 updates, according to the operation input by the player, a two-dimensional or three-dimensional position of a player object, or updates a two-dimensional or three-dimensional position of an enemy object. Moreover, the processor 20 changes a virtual camera (viewpoint) if needed.

In a next step S5, it is determined whether blending is to be executed. Here, the processor 20 determines whether the blending flag 304b is being turned on. If "NO" is determined in the step S5, that is, if the blending is not to be executed, the original image data drawn with the first pixels, here, the data of a game image (i.e., the display image data) of the game image is drawn in the frame buffer 304c, and the process proceeds to a step S13. For example, when a game image of a game scene that is newly created is to be generated or a game image of a virtual game created with assuming the second pixel from the beginning, the processor 20 determines "NO" in the step S5.

On the other hand, if "YES" is determined in the step S5, that is, if the blending is to be executed, the first intermediate image data is drawn in the frame buffer 304c in a step S9 and the second intermediate image data is drawn in the frame buffer 304d in a step S11, and the process proceeds to the step S13.

In the step S13, the game image is displayed. Here, the processor 20 outputs to the display control device 32 the display image data stored in the frame buffer 304c or the first intermediate image data stored in the frame buffer 304c and the second intermediate image data stored in the frame buffer 304d, thereby to make the display 36 display a game screen. Alternatively, the game screen displayed on the display 36 is updated.

Then, in a step S15, it is determined whether the game is to be ended. Here, it is determined whether the player instructs the end of game or the game is over. If "NO" is determined in the step S15, that is, if it is not the end of game, the process returns to the step S3. On the other hand, if "YES" is determined in the step S15, that is, if it is the end of game, the overall game processing is terminated.

In addition, although the example shown in FIG. 6 has explained a case where an application of the virtual game is executed, it does not need to be limited to this. When the original image data drawn with the first pixels is to be drawn by the second pixels, similar processing is executed for other types of applications. In that case, the virtual game is changed to a further type of application in the flowchart shown in FIG. 6 and description thereof, and processing according to the further type of application is executed.

According to this embodiment, when the original image data drawn with the first pixels is to be drawn by the second pixels, by increasing the number of pixels arranged in the horizontal direction, a fact that the width is shorter than that of the first pixel is compensated, and the colors that two adjacent first pixels in positions corresponding to the second pixel are mixed with the transparency according to the area ratio of portions superposed with the second pixel, so that it is possible to display an image similar to the original image drawn with the first pixels. Therefore, it is possible to prevent the user from feeling uncomfortable in appearance as much as possible.

Moreover, according to this embodiment, since it is the display control device 32 that synthesizes the two intermediate image data and outputs the synthesized output image to the display 36, it is not necessary for the processor 20 to execute the processing of synthesizing. Therefore, a processing load of the processor 20 can be reduced. However, when a throughput of the processor 20 is high enough, the processing of synthesizing the two intermediate image data can be executed by the processor 20.

In addition, although the processor 20 describes the identification number of the lookup table as the pixel data for each of the second pixels when the game image is drawn in the frame buffers 304c and 304d in this embodiment, the color data may be directly described for each of the second pixels. In such a case, the display control device 32 only needs to mix the first intermediate image data and the second intermediate image data and output the output image data to the display 36.

Moreover, although the area or portion where five (5) first pixels are arranged in the horizontal direction is to be drawn by six (6) second pixels arranged in the horizontal direction in this embodiment, this is an example and should not be limited. In another example, the area or portion where ten (10) first pixels are arranged in the horizontal direction in the original image data may be drawn by twelve (12) second pixels arranged in the horizontal direction.

Moreover, the N/M times need not be 1.2 times, and another multiple may be used. For example, if the pixel aspect ratio of the first pixel is 1.4:1 and a pixel aspect ratio of the second pixel is 1:1, it is possible to set N/M times 1.4 times.

Moreover, the second pixel does not need to be limited to a square shape, and if the vertical length of the second pixel is set to the same length as the first pixel, the second pixel may be a shape that the horizontal width is shorter than the first pixel. For example, if the pixel aspect ratio of the first pixel by which the original image data is drawn is 1.2:1 and a pixel aspect ratio of the second pixel is 1.1:1, it is possible to set N/M times 10/9 times. In this case, the horizontal width of nine (9) first pixels is not in agreement with the horizontal width of ten (10) second pixels, but they are almost the same, therefore, as similar to the above-described embodiment, by generating the first intermediate image data and the second intermediate image data and synthesizing them, it is possible to approximate the output image to looking effects of the original image.

Furthermore, although this embodiment is described on the premise that the first pixel and the second pixel are the same in the vertical length, it does not need to be limited to this. When the vertical lengths are different, the first pixel or the second pixel is enlarged or reduced in a state where the pixel aspect ratios are maintained so that the vertical lengths of the first pixel and the second pixel become the same, thereby determining the multiple of N/M, and may determine the mixing ratio of the corresponding two first pixels used for calculating the colors of the second pixels other than the both ends of the second area.

Moreover, although the information processing apparatus 10 provided with the display 36 is described in this embodiment, the display 36 may be provided separately from the information processing apparatus 10. In such a case, an information processing system (or image processing system) is constituted by the information processing apparatus 10 and the display 36. Moreover, as the information processing apparatus 10, it is also possible to utilize other electronic devices such as a game apparatus, desktop PC, a notebook PC, PDA, a tablet PC, and a smartphone.

Furthermore, the configuration of the information processing apparatus, the mixture processing and specific numeral values shown in this embodiment are mere examples and should not be limited and can be appropriately changed according to actual products.

Furthermore, as long as the same effect or result is obtained, an order of respective steps shown in the flow chart may be appropriately changed. For example, an order that the steps S13 and S15 are processed may be reversed.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An image processing apparatus, comprising:
   one or more processors; and
   a memory configured to store computer readable instructions that, when executed, cause the apparatus to:
      generate two intermediate image data in each of which a number of pixels in a horizontal direction is larger than that of original image data by generating, for each of first areas formed when dividing the original image data by every M first pixels in the horizontal direction, each of corresponding second areas each being formed by N second pixels (N is larger than M); and
      generate single output image data by mixing colors of the N second pixels in corresponding positions in the generated two intermediate image data, wherein
   in each of the second areas of each of the generated two intermediate image data,
      setting colors of the N second pixels at both ends so that results of mixing the colors in corresponding positions of the two intermediate image data are in agreement with colors of the M first pixels at both ends of the first area of the original image data, and
      setting a color of each of the N second pixels between the both ends, in each of the second areas of each of the generated two intermediate image data, based on colors of adjacent two first pixels within the first area of the original image data in corresponding positions of the two intermediate image data.

2. The image processing apparatus according to claim 1, wherein the apparatus is further caused to generate the single output image data by overlapping first intermediate image data from the two intermediate image data of a foreground side and second intermediate image data from the two intermediate image data of a background side, colors of a part of the N second pixels of the first intermediate image data are colors that transparency is reflected to colors of a part of the M first pixels of the original image data.

3. The image processing apparatus according to claim 2, further comprising a storage device configured to store a lookup table including a first color palette corresponding to respective colors used for the M first pixels of the original image data and one or more second color palettes in which one or more predetermined different transparency are set to the respective colors, wherein
   the apparatus is further caused to acquire at least a part of colors of the pixels of the first intermediate image data and the second intermediate image data by referring to the one or more second color palettes.

4. The image processing apparatus according to claim 3, wherein the image processing apparatus is provided with a second color palette, from the one or more second color palettes, whose predetermined transparency corresponds to α (0<α<1) but is not provided with the second color palette that corresponds to transparency of 1−α, wherein
   the apparatus is further caused to generate a fifth color by mixing a sixth color and a first color, wherein the fifth color is substantially equal to a fourth color generated by mixing a second color and a third color of the second pixel of the second intermediate image data, wherein in the second color the transparency of 1−α is reflected to a first color of the second pixel of the first intermediate image data, and in the sixth color the transparency of α is reflected to the third color of the second pixel of the first intermediate image data and the first color of the second pixel of the second intermediate image data.

5. An image processing apparatus, comprising:
   one or more processors; and
   a memory configured to store compute readable instructions that, when executed by the one or more processor, cause the apparatus to
      generate two intermediate image data in each of which a number of pixels in a horizontal direction is larger than that of original image data, for each of first areas formed when dividing the original image data by every five (5) first pixels in the horizontal direction, by generating each of corresponding second areas each being six (6) second pixels in the horizontal direction; and
      generate single output image data by mixing colors of the second pixels in corresponding positions in the two intermediate image data, wherein
   when colors of the five first pixels are "a" color, "b" color, "c" color, "d" color and "e" color from left, in the six second pixels corresponding to the second areas of the generated output image data,
      colors of the second pixels at both end are in agreement with "a" color and "e" color of the first pixels at both end of the first area of the original image data, and
      a color of each of the second pixels between the both ends is generated by mixing the colors of each set (b, a), (c, b), (c, d) and (d, e) with predetermined ratios sequentially from the left.

6. The image processing apparatus according to claim 5, wherein
   colors of the second pixels in each of the second areas of first intermediate image data out of the two intermediate image data other than the second pixels at the both ends are "b" color that transparency is 80%, "c" color that transparency is 60%, "c" color that transparency is 60% and "d" color that transparency is 80%, respectively, and colors of the second pixels in each of the second areas of second intermediate image data out of the two intermediate image data other than the second pixels at the both ends are "a" color that transparency is 20%, "b" color that transparency is 40%, "d" color that transparency is 40% and "e" color that transparency is 20%, respectively.

7. The image processing apparatus according to claim 6, wherein
   colors of the second pixels at both ends in each of the second areas of the first intermediate image data of a foreground side out of the two intermediate image data are "a" color that transparency is 0% and "e" color that transparency is 0%, respectively.

8. An image processing apparatus, comprising:
   one or more processors; and
   a memory configured to store computer readable instructions that, when executed by the one or more processors, cause the apparatus to generate two intermediate image data in each of which a number of pixels in a horizontal direction is larger than that of original image data by generating, for each of first areas formed when dividing the original image data by every M first pixels in the horizontal direction, each of corresponding second areas each being formed by N second pixels (N is larger than M); and generate single output image data by mixing colors of the N second pixels in corresponding positions of the generated two intermediate image data, wherein in each of the second areas of each of the generated two intermediate image data, setting colors of the N second pixels at both ends so that results of mixing the colors in corresponding positions of the two intermediate image data are in agreement with colors of the M first pixels at both ends of the first area of the original image data, and for each of the N second pixels between the both ends in corresponding positions in the two intermediate image data, generating a color by mixing colors of two adjacent first pixels in the first area of the original image data with a ratio of areas of portions that a second pixel is corresponding to the two adjacent first pixels.

9. An image processing apparatus, comprising:
one or more processors; and
a microcontroller, wherein
the one or more processors are configured to generate two intermediate image data in each of which a number of pixels in a horizontal direction is larger than that of original image data by generating, for each of first areas formed when dividing the original image data by every M first pixels in the horizontal direction, each of corresponding second areas each being formed by N second pixels (N is larger than M), and the microcontroller is configured to generate single output image data by mixing colors of the N second pixels in corresponding positions of the generated two intermediate image data, and the one or more processors are further configured to output the output image data generated by the microcontroller, wherein in each of the second areas of each of the two intermediate image data generated by the one or more processors, setting colors of the N second pixels at both ends so that results of mixing the colors in corresponding positions of the two intermediate image data are in agreement with colors of the M first pixels at both ends of the first area of the original image data, and setting a color of each of the N second pixels between the both ends, in each of the second areas of each of the generated two intermediate image data, based on colors of adjacent two first pixels within the first area of the original image data in corresponding positions of the two intermediate image data.

10. A non-transitory computer readable storage medium storing an image processing program executable by a computer of an image processing apparatus that comprises one or more processors and an output image generating portion configured to output single output image data by mixing colors of pixels in corresponding positions of two intermediate image data, wherein the image processing program causes the one or more processors to provide execution comprising:

generating two intermediate image data in each of which a number of pixels in a horizontal direction is larger than that of original image data by generating, for each of first areas formed when dividing the original image data by every M first pixels in the horizontal direction, each of corresponding second areas each being formed by N second pixels (N is larger than M); and outputting the two generated intermediate image data to the output image generating portion, wherein in each of the second areas of each of the generated intermediate image data, setting colors of the N second pixels at both ends so that results of mixing the colors in corresponding positions of the two intermediate image data are in agreement with colors of the M first pixels at both ends of the first area of the original image data, and setting a color of each of the N second pixels between the both ends, in each of the second areas of each of the generated two intermediate image data, based on colors of adjacent two first pixels within the first area of the original image data in corresponding positions of the two intermediate image data.

11. An image processing method, comprising:
generating two intermediate image data in each of which a number of pixels in a horizontal direction is larger than that of original image data by generating, for each of first areas formed when dividing the original image data by every M first pixels in the horizontal direction, each of corresponding second areas each being formed by N second pixels (N is larger than M); and generating single output image data by mixing colors of the N second pixels in corresponding positions in the generated two intermediate image data, wherein in each of the second areas of each of the generated two intermediate image data, setting colors of the N second pixels at both ends so that results of mixing the colors in corresponding positions of the two intermediate image data are in agreement with colors of the M first pixels at both ends of the first area of the original image data, and setting a color of each of the N second pixels between the both ends, in each of the second areas of each of the generated two intermediate image data, based on colors of adjacent two first pixels within the first area of the original image data in corresponding positions of the two intermediate image data.

12. The image processing apparatus according to claim 1, wherein when drawing the original image data having been drawn with the M first pixels by the N second pixels, the two intermediate image data drawn by the N second pixels a number of which is N/M times in the horizontal direction are generated.

* * * * *